INVENTORS
GEORGE N. CHATHAM
O O SHURTLEFF
BY
Brown, Critchlow, Flick & Peckham
ATTORNEYS Oct. 9, 1962    G. N. CHATHAM ET AL    3,057,377
FLUID PRESSURE OPERATED VALVES
Filed March 7, 1961    2 Sheets-Sheet 2
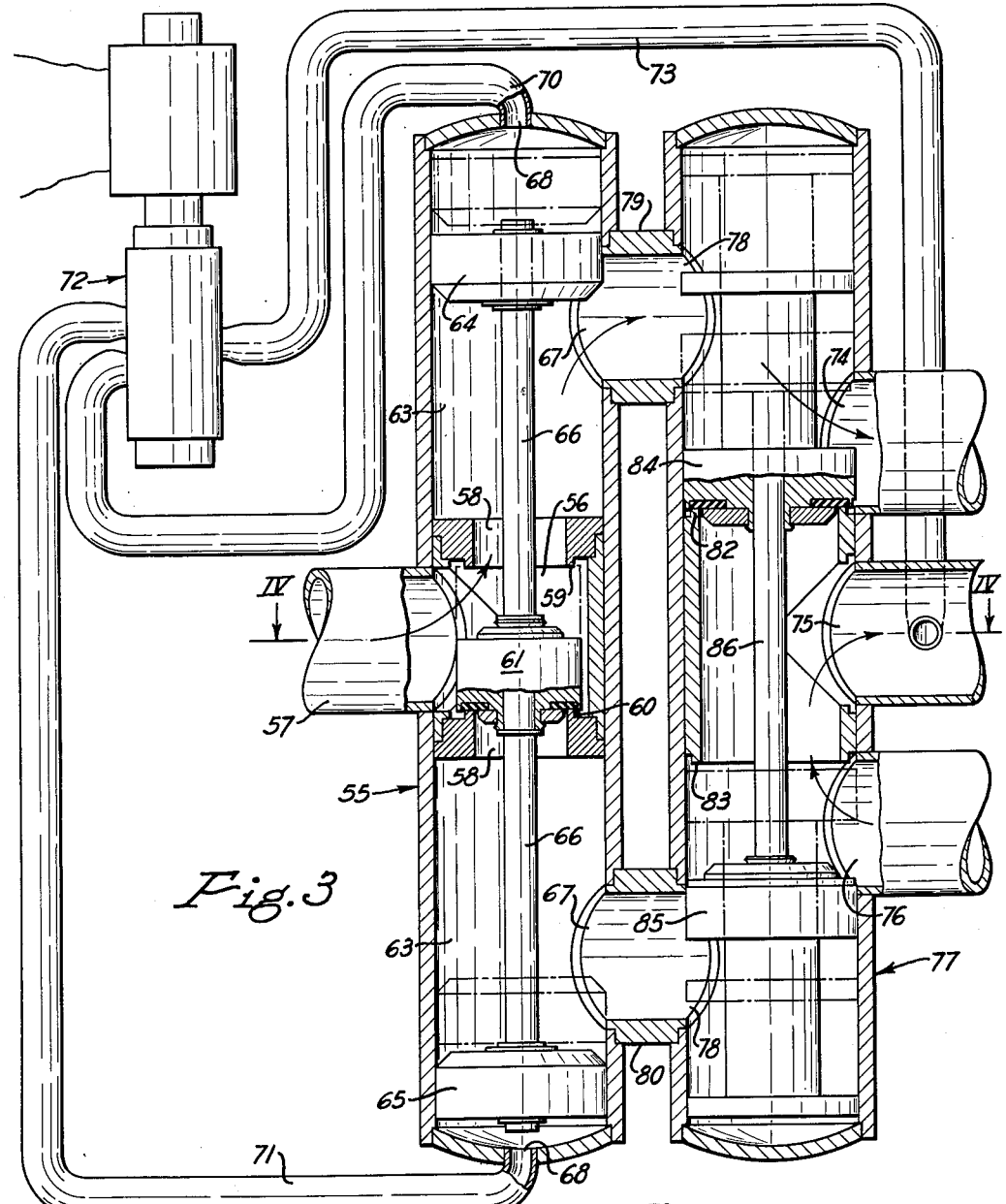
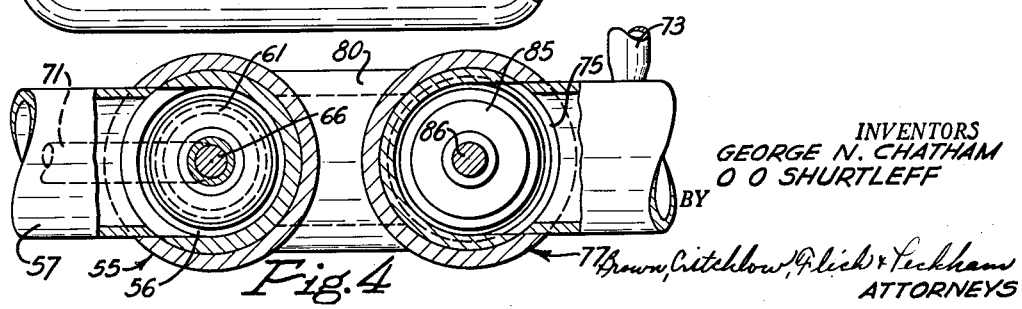
INVENTORS
GEORGE N. CHATHAM
O O SHURTLEFF
BY
ATTORNEYS

United States Patent Office 3,057,377
Patented Oct. 9, 1962

3,057,377
FLUID PRESSURE OPERATED VALVES
George N. Chatham and OO Shurtleff, Austin, Tex., assignors to Chatleff Controls, Inc., Austin, Tex., a corporation of Texas
Filed Mar. 7, 1961, Ser. No. 93,913
1 Claim. (Cl. 137—625.5)

This invention relates to valves that are actuated by fluid pressure differences, and more particularly to three-way valves especially designed for use in reversing valves.

One place where reversing valves are used extensively is in refrigeration systems, in which the essential periodic defrosting of the evaporator can be accomplished by reversal of the flow direction of the refrigerant. This reversal directs the full flow of the hot compressed refrigerant gas to the evaporator. Another application is in heat pump systems, where at one time a cooling effect is desired and at other times a heating effect. Many valves have been designed for this purpose, but all of them have shortcomings of one form or another. The fault often lies in the three-way valve that forms part of the reversing valve.

It is among the objects of this invention to provide an improved three-way valve, which is of simple and inexpensive construction, which operates equally well in either valving direction, which is actuated by moderate differences in fluid pressure and small flows, which will continue to operate satisfactorily under overload conditions of both flow and pressure, which produces small pressure drop, which will operate when mounted in any position, and which is especially suitable for use in a four-way reversing valve. Further objects are to provide a reversing valve that will not malfunction or fail on account of overloading in pressure or flow, which is not sensitive to variations in pressure of the high and low pressure fluid, which works with increasing force as the pressure difference increases, which will operate properly in the presence of minor deficiencies in the performance of various types of actuating pilot valves, and which is symmetrical in construction about a central transverse plane.

The invention is illustrated in the accompanying drawings, in which

Figure 1:
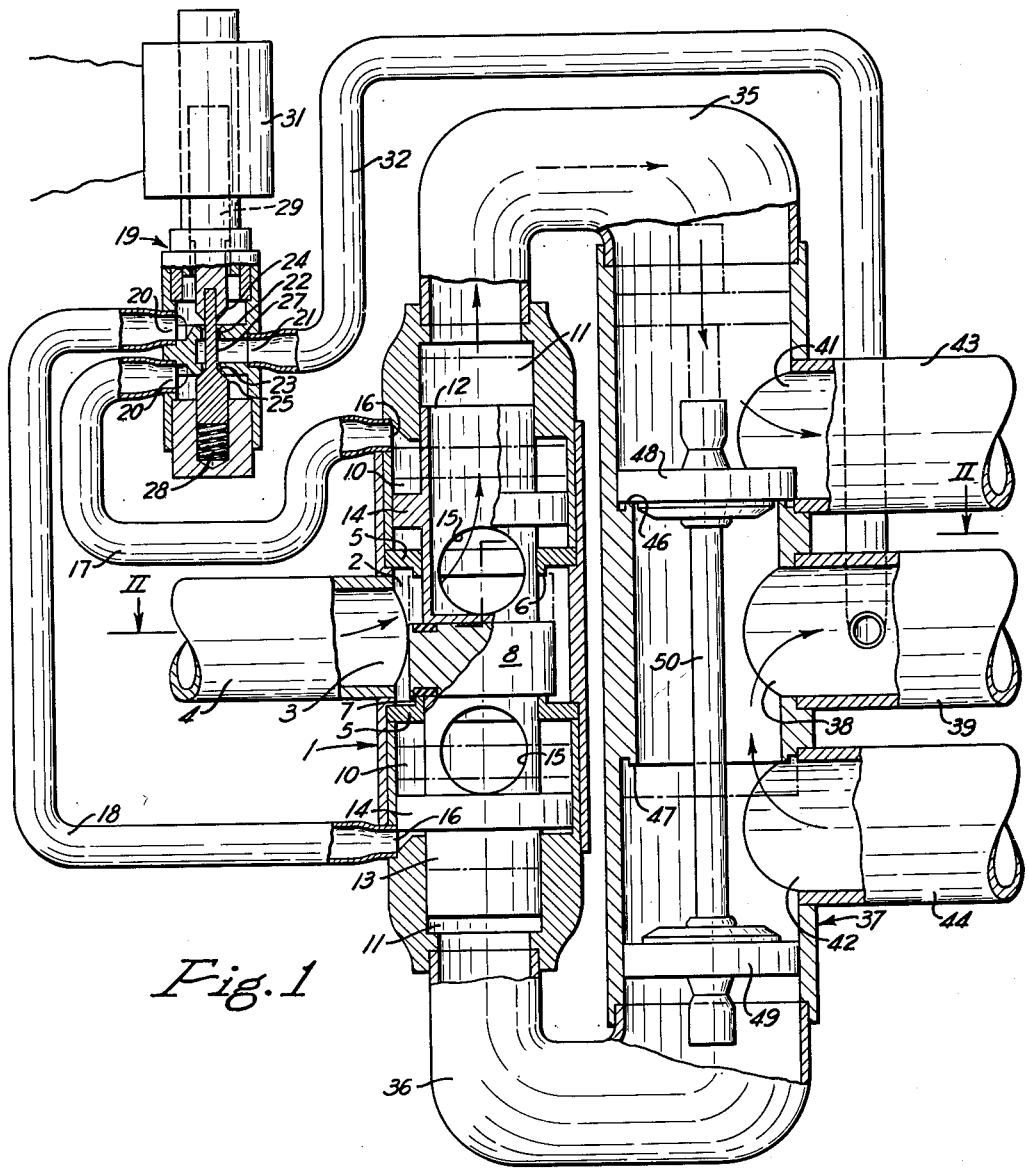
Figure 2:
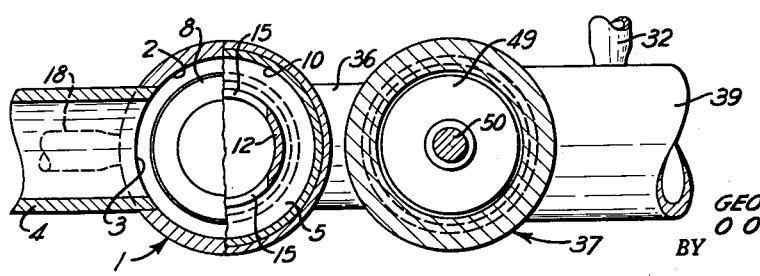

FIG. 1 is a longitudinal section through our valve;
FIG. 2 is a cross section taken on the line II—II of FIG. 1;
FIG. 3 is a longitudinal section through a modified valve; and
FIG. 4 is a cross section taken on the line IV—IV of FIG. 3.

Referring to FIGS. 1 and 2 of the drawings, the straight tubular housing 1 of a three-way valve is provided midway between its ends with a central inlet chamber 2, which has a central inlet 3 in its side that can be connected by a pipe 4 with a source of fluid under pressure. The opposite end walls 5 of the central chamber are provided with axially aligned outlet ports surrounded inside the chamber by valve seats 6 and 7. Inside the chamber there also is a solid valve member 8 that can be moved back and forth from one seat to the other to close off either outlet port.

The portions of the valve housing beyond the opposite ends of the central inlet chamber 2 form aligned cylinders 10, which have aligned outlet openings 11 in their outer ends. Slidably mounted and closely fitted in these outlet openings are the outer ends of tubular members 12 and 13, the inner ends of which are secured to the opposite sides of valve member 8. Inside cylinders 10 the tubular members carry annular pistons 14 that may be integral with them and that move back and forth in the cylinders to move the valve member from one seat to the other.

The effective area of each piston should be somewhat more than the area of either seat. The tubular members also have lateral inlets 15 between the pistons and the central valve member 8.

The outer end portion of each cylinder 10, between the piston therein and its outlet opening 11, forms an annular actuating chamber that is sealed from the outlet opening by means of the tubular member 12 or 13. The outer ends of the actuating chambers are provided with ports 16 that are connected by tubes 17 and 18 to a three-way pilot valve 19 of any suitable construction and mode of actuation. The one shown as an example is an electric valve that has two inlets 20 and one outlet 21. The tubes 17 and 18 are connected to the inlets 20, which communicate with the outlet 21 through upper and lower ports 22 and 23. These ports are closed alternately by valve members 24 and 25 connected by a pin 27 of smaller diameter than the ports. The lower valve member 25 normally rests on a coil spring 28 that is not strong enough to lift the entire movable valve assembly and core. The upper valve member 24 is connected to the core 29 of a solenoid coil 31 which, when energized, will lift the core to open upper port 22 and close the lower port 23. The outlet 21 of this valve is connected by a tube 32 to a region of lower fluid pressure than the pressure in inlet 3, so that whichever tube 17 or 18 is connected through tube 32 to the low pressure, the fluid pressure will be reduced in the actuating chamber of the corresponding cylinder 10 in the main valve housing 1, thereby permitting the higher fluid pressure against the opposite side of the piston in that cylinder to move the piston outward in order to shift valve member 8 to the other valve seat.

The leakage past the other piston enables it to function as a dashpot to partly control the speed with which the valve unit shifts its position. It will be seen that valve housing 1 is symmetrical about a central transverse plane and that the movable valve unit likewise is symmetrical about its central plane parallel to the valve seats. In other words, the opposite end portions of each of those elements are made of identical parts. This makes it easier and less expensive to build the valve with fewer tooling setups, and it also makes it possible to reduce parts inventory by almost half as compared with an asymmetrical valve. Another advantage of its symmetry is that the valve operates equally well for either direction of fluid flow. Also it may be mounted in any position without any significant change in operating characteristics.

Our three-way valve, because of its substantially unrestricted flow passages, has a very low pressure drop, making it practical to use a valve of smaller size for large capacity systems. There is no critical ratio of piston diameter to orifice diameter to prevent malfunction with varying flow rates, as long as the annular piston area is somewhat larger than the seat area to secure prompt unseating when the direction of flow is to be changed. The valve is insensitive to variations in pressure of the high and low pressure gas as long as the pressure difference is great enough acting over the piston area to overcome the weight of the movable valve unit, and the flow rate is not important because operation does not depend upon any venturi effects. Also, as the pressure difference increases, the movable unit moves with greater force in close proportion so that the force is never insufficient or excessive.

The pilot operated three-way valve that has been described can be used in any system where there is a lower pressure region to which pilot valve outlet tube 32 can be connected, and where, preferably, the pressure drops off in the cut-off portion of the system connected to the valve. However, the valve is especially suitable for use as the first section of a four-way reversing valve, such as used in refrigeration systems, in which case the outlets 11 are connected by short tubular fittings 35 and 36 to the opposite inlet ends of a second straight tubular housing 37. The side of the housing is provided with three longitudinally spaced lateral ports. The middle port 38 may be connected by a pipe 39 with the inlet of a refrigerant compressor (not shown), the outlet of which is connected with inlet pipe 4 of the three-way valve, and the two outer ports 41 and 42 will then be connected by pipes 43 and 44, respectively, to an evaporator and a condenser (not shown) that are connected in series in a well-known manner.

The central portion of valve housing 37 has valve seats 46 and 47 located between middle port 38 and the other two ports and facing the inlet ends of that housing. A spool valve in the housing can engage the two seats alternately. It includes a pair of piston-like closure members 48 and 49 slidably mounted in the housing and spaced apart by a rod 50 long enough to hold one closure member between an inlet end of the housing and the nearest port when the other closure is seated.

With the parts in the positions shown in FIG. 1, high pressure fluid coming through pipe 4 enters inlet chamber 2 of the three-way valve section of the reversing valve and flows through the exposed inlet 15 of tubular member 12 and then out through that member and around through fitting 35 into the second valve housing 37. The high fluid pressure holds the spool against seat 46 so the fluid flows out of the housing through port 41 and ultimately at lower pressure back through port 42 and then out through middle port 38 to the inlet of a compressor. The piston ends of the spool valve do not fit housing 37 tightly, so the lower pressure at the middle port, by leakage around closure member 49, reduces the pressure in fitting 36 and thereby holds valve member 8 strongly against seat 7, because of the difference of pressure on the opposite sides of valve member 8 acting over the area of seat 7. Thus, as long as both movable valve units are in the positions shown, the fluid pressures act directly to maintain those positions. The pilot valve and the actuating chamber in cylinder 10 connected with it produce no force because of the more or less equalization of pressure on both sides of piston 14 in that chamber, and flow of fluid through the pilot valve virtually ceases. The pilot valve serves no purpose as long as member 8 is seated.

When the pilot valve is operated to shift to its other position, the low pressure region at middle port 38 is connected through tube 32 and the pilot valve and tube 17 to the other actuating chamber inside of a cylinder 10. The pressure in that chamber will be quickly reduced and, since the area of piston 14 is greater than the area of seat 7, the fluid pressure against the inner side of the piston will move that piston toward the outer end of the cylinder and thereby shift valve member 8 from seat 7 to seat 6. The moment that occurs, a high pressure fluid is directed from the inlet chamber through tubular member 13 and around through fitting 36 into housing 37, where it rapidly moves closure member 49 against seat 47 and moves closure member 48 into the dotted line position between port 41 and the corresponding end of the housing. The pattern of fluid flow during this movement is such that it is impossible for the spool valve to stop in any intermediate position. The fluid then flows out through port 42, back through port 41 and then out through the middle port 38, thereby reversing the flow through pipes 43 and 44.

It will be seen that the spool valve in housing 37 reacts on and cooperates with the valve movement in housing 1, securing a rapid and effective transfer of low pressure to the closed side of housing 1 and thereby holding the valve member 8 securely in position against a seat, independent of continued functioning of the pilot valve and the actuating chamber communicating with it. This means that the pilot valve serves a useful function only while the reversing valve is in the process of shifting its positions. While the reversing valve remains in one set of positions, poor seating of the pilot valve is of no importance as long as leakage through the closed side of the pilot valve is less than the leakage into the corresponding actuating chamber. Consequently, a very simple and inexpensive pilot valve of any of a variety of designs may be used without affecting adversely the functioning of a reversing valve of this design.

In the modification shown in FIGS. 3 and 4, the straight tubular housing 55 of a three-way valve again has a central inlet chamber 56, to which an inlet pipe 57 is connected. The pipe may come from a compressor or other source of high pressure fluid. The aligned outlet ports 58 of the chamber are encircled by valve seats 59 and 60, which can be engaged alternately by a valve member 61 inside the chamber. The portions of the housing beyond the outer ends of the outlet ports form cylinders 63, in which pistons 64 and 65 are slidably disposed. The pistons are mounted on the opposite ends of rods 66 that extend inwardly through outlet ports 58 and are rigidly connected to valve member 61. Each cylinder, between its piston and the valve member, is provided with a lateral outlet opening 67. The pistons seal off these openings from the actuating ports 68 in the ends of the housing, forming an actuating chamber between the outer end of each piston and the corresponding end of the housing, but there is enough leakage past the pistons to secure a satisfactory dashpot action.

The two actuating ports are connected by tubes 70 and 71 to a three-way pilot valve 72 that may have the same construction as the one shown in FIG. 1. The outlet of the pilot valve is connected by a tube 73 to a low pressure region. Here again, the low pressure region may be the middle of three longitudinally spaced lateral ports 74, 75, and 76 in the side of a second straight tubular housing 77, which has lateral inlet openings 78 near its opposite ends connected by short tubes 79 and 80 with the outlet openings 67 of the first housing.

The second housing 77 has outwardly facing valve seats 82 and 83 between its middle port 75 and the two outer ports 74 and 76. A further design variation is shown for the spool valve that closes either seat, the valve having piston-like closure members 84 and 85 spaced a minimum distance apart by a rod 86 that can slide in axial bores extending part way through the closure members. The closure members fit rather loosely in the housing and are themselves spool-shape, so that their outer ends may operate in the ends of the housing beyond inlet openings 78 to produce a dashpot effect and thus cushion the movement of the entire spool valve as it closes against either seat 82 or 83. When either closure member 84 or 85 is against its seat, the adjacent inlet opening 78 is connected through the end portion of the housing with the adjacent lateral port 74 or 76. A certain amount of leakage can occur from the other inlet opening 78, past the unseated closure member to the outlet port 75, thereby providing low pressure in the end of housing 55 that is shut off from the high pressure fluid by the seating of valve member 61.

Thus it can be seen that this modified form of both the three-way valve and the complete reversing valve operates in the same way as the one previously described and shown in FIG. 1. These valves are likewise symmetrical valves, with all the advantages that result from such construction. It should be noted, however, that the valve shown in FIG. 3 has a higher pressure drop for high rates of flow than the one described first, because of the less favorable configuration of the fluid passages. Nevertheless, it is somewhat less expensive to fabricate and it performs quite adequately in many applications.

When either form of valve is used as a three-way valve only, then the length of time the pilot valve is required to hold the main valve seated is dependent on the characteristics of the system to which it is connected and the rate at which the pressure drops in the cut-off portion of the system. This time is usually quite brief.

According to the provisions of the patent statutes, we have explained the principle of our invention and have illustrated and described what we now consider to represent its best embodiment. However, we desire to have it understood that, within the scope of the appended claim, the invention may be practiced otherwise than as specifically illustrated and described.

We claim:

A three-way valve for a fluid pressure line, comprising a housing provided with a central inlet chamber having a central lateral inlet and two aligned end outlet ports, valve seats in said chamber around the outlet ports, a valve member in said chamber movable from either seat to the other, the portions of said housing beyond opposite ends of said chamber forming aligned cylinders having aligned outlet openings in their outer ends, a piston in each cylinder having an effective area greater than the area of either seat, the pistons having axial openings therethrough and leakage clearance with the cylinder walls, and tubular members projecting axially from both sides of the pistons and having inner ends rigidly connected to said valve member and outer ends slidably mounted in said outlet openings, the tubular members having lateral inlets between said valve member and the pistons, said housing being provided with an actuating port opening into the space between each piston and the adjacent outlet opening, said actuating ports being adapted to be connected alternately with a region of lower fluid pressure than the pressure in said inlet chamber to cause the piston nearer said inlet chamber to pull said valve member from one of said seats toward the other seat, thereby transferring the fluid flow through the valve from one of said outlet openings to the other.

References Cited in the file of this patent

UNITED STATES PATENTS

| 2,474,304 | Clancy | June 28, 1949 |
| 2,927,606 | Matchett et al. | Mar. 8, 1960 |
| 3,004,557 | Weigers | Oct. 17, 1961 |
| 3,007,495 | Whitlock | Nov. 7, 1961 |

FOREIGN PATENTS

| 882,423 | France | Mar. 1, 1943 |